United States Patent
Natanzon et al.

(10) Patent No.: US 10,055,148 B1
(45) Date of Patent: Aug. 21, 2018

(54) STORING APPLICATION DATA AS AN ENHANCED COPY

(71) Applicant: EMC Corporation, Hopkinton, MA (US)

(72) Inventors: Assaf Natanzon, Tel Aviv (IL); Jehuda Shemer, Kfar Saba (IL); Ron Bigman, Holon (IL); Amit Lieberman, Raanana (IL); Yana Vaisman, Netanya (IL); Oded Peer, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 14/978,351

(22) Filed: Dec. 22, 2015

(51) Int. Cl.
*G06F 3/00* (2006.01)
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ......... G06F 3/0619; G06F 3/065; G06F 3/067
USPC ........................................................ 711/162
See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,478,955 B1 | 7/2013 | Natanzon et al. | |

(Continued)

*Primary Examiner* — Jae Yu
(74) *Attorney, Agent, or Firm* — Daly, Crowley, Mofford & Durkee, LLP

(57) ABSTRACT

In one example, a method includes generating an enhanced copy, which includes application data generated from using an application, the application, a configuration of the application and runtime settings to run the application. The method also includes restoring at least one of the application, the configuration of the application and the runtime settings using the enhanced copy.

18 Claims, 3 Drawing Sheets

(56) References Cited

U.S. PATENT DOCUMENTS

| | | |
|---|---|---|
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |

(56) References Cited

U.S. PATENT DOCUMENTS

| | | |
|---|---|---|
| 9,846,698 B1 | 12/2017 | Panidis et al. |
| 2003/0191916 A1* | 10/2003 | McBrearty .......... G06F 11/1464 711/162 |
| 2008/0133863 A1* | 6/2008 | Boggs ................... G06F 3/0605 711/170 |

* cited by examiner

STORING APPLICATION DATA AS AN ENHANCED COPY

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include backup, for storing organizational production site data on a periodic basis. Another conventional data protection system uses data replication, by generating a copy of production site data of an organization on a secondary site, and updating this copy with changes. The backup storage system may be situated in the same physical location as the production storage system, or in a physically remote location. Data replication systems generally operate either at the application level, at the file system level, or at the data block level.

SUMMARY

In one example, a method includes generating an enhanced copy, which includes application data generated from using an application, the application, a configuration of the application and runtime settings to run the application. The method also includes restoring at least one of the application, the configuration of the application and the runtime settings using the enhanced copy.

In another aspect, an apparatus includes electronic hardware circuitry configured to generate an enhanced copy that includes application data generated from executing an application, the application and data that enables the application to operate. The circuitry is also configured to access the application data by restoring from the enhanced copy the application and the data that enables the application to operate.

In a further aspect, an article includes a non-transitory computer-readable medium that stores computer-executable instructions. The instructions cause a machine to generate an enhanced copy that includes application data generated from executing an application, the application and data that enables the application to operate. The instructions also cause the machine to access the application data by restoring from the enhanced copy the application and the data that enables the application to operate.

DETAILED DESCRIPTION

Data generated by using an application (application data) is often saved and replicated. However, what is not saved also is the application itself and the runtime environment. For example, a user may have an old copy of the application data but not a means to access and use the data because, for example, the application is gone or has a different version, the components required to run the application no longer exist and so forth. Thus, merely saving just the application data does not ensure being able to access the application data in the future. With some government regulators requiring storing copies up to seven years, for example, and with technologies changing at a much faster cycle, just saving application data is becoming a major problem. Described herein are techniques to save application data as an enhanced copy, which includes at least the application data, the application and runtime environment needed to access and use the application data. Thus, a full working application is restored—not just the data. This has significant advantages in testing, developing and relocating data to new cloud networks.

Figure 1:
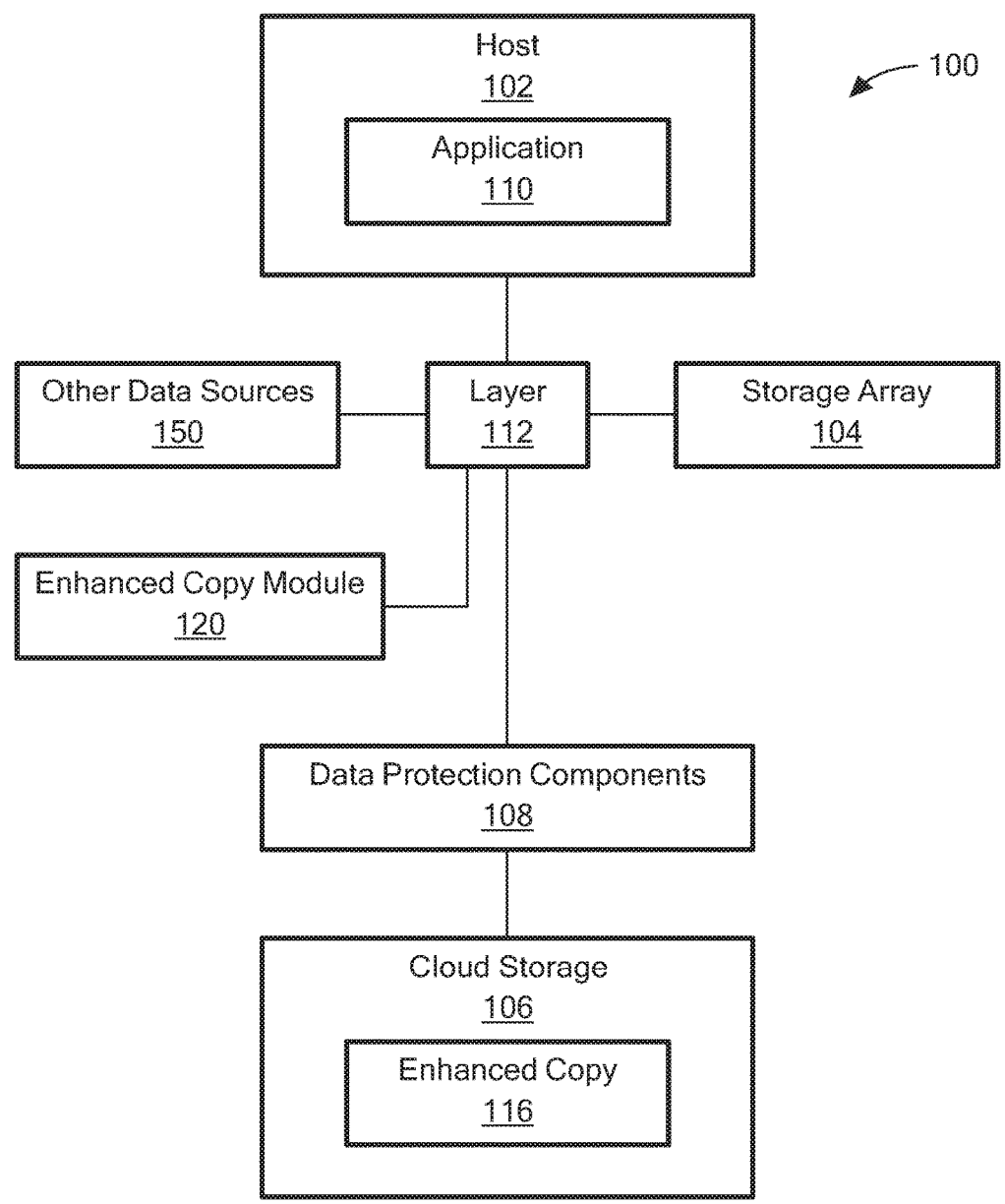
FIG. 1 is a block diagram of an example of a system to generate and manage an enhanced copy, according to one embodiment of the disclosure.

Referring to FIG. 1, a data protection system 100 is an example of a system to store an enhanced copy. The system 100 includes a host 102, a storage array 104, a cloud storage 106, data protection components 108, a layer 112 and other data sources 150 (e.g., object stores, databases, volumes and so forth). In one example, the storage array 104 is the source location with data that is replicated to the cloud storage 106, which is the target location.

The system 100 also includes an enhanced copy module 120 used to generate an enhanced copy 116. While the enhanced copy module 120 is shown as a separate block in FIG. 1, in other examples, the enhanced module 120 may be located anywhere in system 100 including being in the layer 112.

The host 102 includes an application 110.

In one example, the layer 112 includes at least one of a block storage API (application programming interface), an object storage API, a key/value API, a file system API, a database API and a messaging API.

The cloud storage 106 includes the enhanced copy 116. An enhanced copy 106 includes application data and other data to be able to regenerate data. For example, other data may include the application and the whole operating environment which may include run time environment, run time parameters, data, data copies and any other data needed for the application 110 to operate.

In one particular example, an enhanced copy includes application data, the application, application configuration and runtime settings. In some examples, application data is a consolidation copy of data sources of the application. These data copies may be generated using existing backup/replication technologies or any other method and are in some examples a set of different copies of different sources. Currently the latter is typically the only information stored by backup applications.

In some examples, the application itself is stored to be able to restore/access the data with the correct application version, which in some examples includes the application itself and the applications that generated the data copies. In some examples, the application configuration enables the application to be run from the enhanced copy. In some examples, runtime settings enable the environment to be mimicked.

An enhanced copy ensures that even if the enhanced copy is dormant for seven years, for example, the data can still be accessed. The restore operations may use some or all of the above information in an enhanced copy to re-create copies for different purposes. For example, the data and runtime may be used from an enhanced copy but the restore uses a new version of the application.

Figure 2:
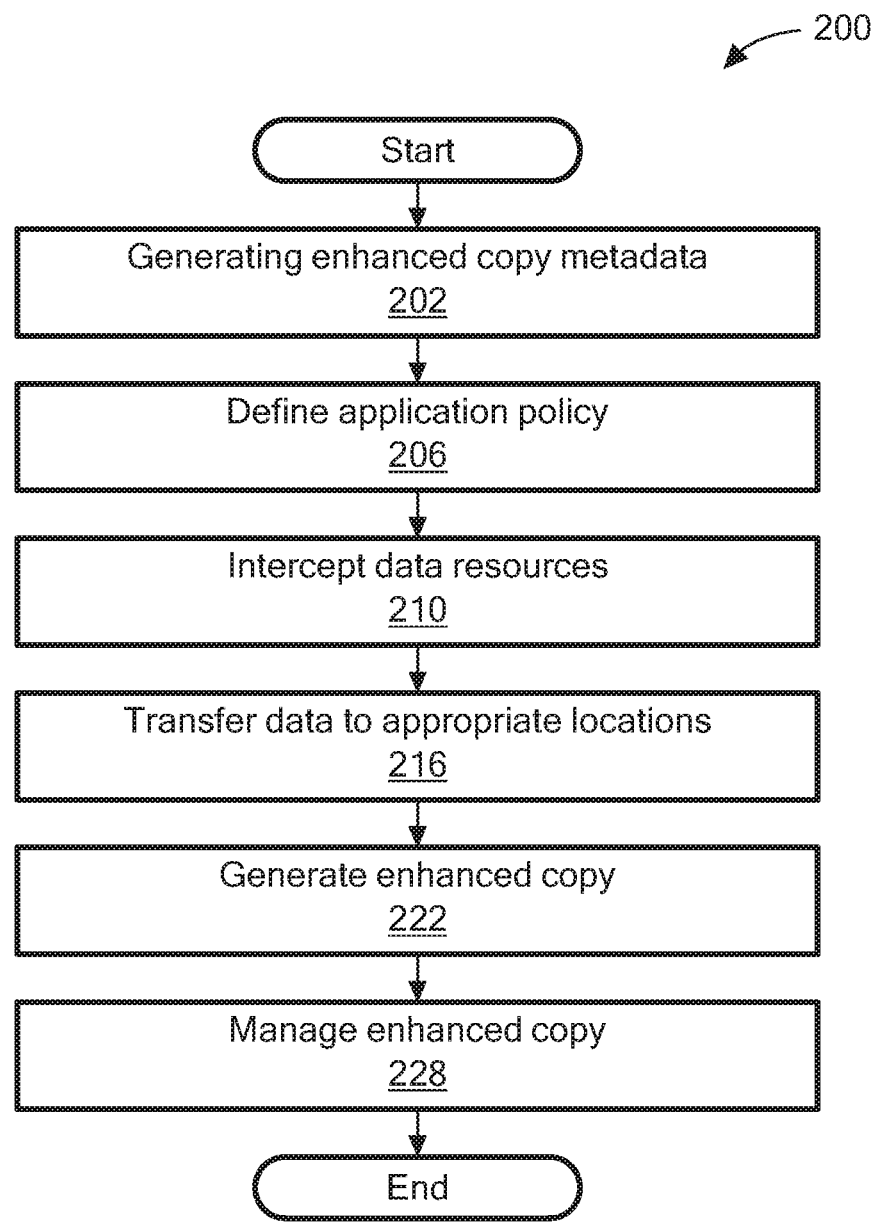
FIG. 2 is a flowchart of an example of a process to generate and manage the enhanced copy, according to one embodiment of the disclosure.

In some examples, applications with multiple data sources (e.g., object stores, databases, volumes and so forth) can then be backed up and restored correctly as parts of the data of the application are stored together. Referring to FIG. 2, a process 200 is an example of process to generate and manage an enhanced copy. In one example, the process 200 is executed by the enhanced copy module 120.

Process 200 generate enhanced copy metadata (202). The enhanced copy module 120 adds additional parameters to the enhanced copy than previously used in the art. For example, an enhanced copy will include metadata on application operation parameters which describe how to run the application, number of instances, scale out parameters and availability information. In addition, the application metadata may include metadata on how to connect to additional resources: databases, object stores, data volumes, file systems and so forth. Additional application metadata added may further include metadata that provides information about the resources that the application uses including one or more of IDs, names and types.

Process 200 defines the application policy (206). For example, the enhanced application module 120 defines what service to provide (backup, replication, HA (high-availability) storage, multiple copies, multiple point-in-time copies and so forth) and the location where the resulting enhanced copy will be (or should be) located.

Process 200 intercepts data resources (210) and transfers the data to appropriate location (216). For example, the layer 112 uses the enhanced copy metadata to intercept data resources used by the application (e.g., other sources 150) and transfers the data to the appropriate location.

The process 200 ensures having the elements that constitute an enhanced copy, for example, the application data, the actual application, the application configuration and the runtime environment information. Interception of data sources is a method to retrieve copies of application data. This can be a splitter in case of replication, an array snapshot mechanism, a backup agent and so forth.

Process 200 generates an enhanced copy (222). For example, the enhanced copy is generated using at least the enhanced copy metadata generated in processing block 202, the application policy defined in processing block 206 and the information intercepted from the data resources in processing block 210.

In one example, the enhanced copy module 120 orchestrates generation of enhanced copies of the application data (e.g., BITC application data), possibly in multiple locations and attaches to the application data, the application (e.g., BITC application) modules and runtime environment parameters. Attaching to the application data, the application modules and runtime environment parameters means that every enhanced copy has the ability to be reconstructed back to a full running application with all the related data. That is, this generates copies of the full application and not just the application data.

In one example, the enhanced copy may be generated at the source location (e.g., production site) and transferred to the target location (e.g., replication site). In another example, the enhanced copy may be generated at the target location.

Process 200 manages the enhanced copy (228). For example, the enhanced copy module 120 perform one or more of the following management functions: tracks the location, retention and integrity of the enhanced copies; performs recovery operations on the enhanced copies; performs maintenance operations on the enhanced copies; and manages the cost of storage of the application copies across multiple locations/clouds.

Tracking the location, retention and integrity of the enhanced copies ensures that enhanced copies can be utilized when needed and that restored data is correct. Performing recovery operations on the enhanced copies includes restoring an application from an enhanced copy (to existing or new instance); failing over the application to an enhanced copy and exposing an enhanced copy as a snapshot for business continuity purposes. Performing maintenance operations on enhanced copies includes deleting enhanced copies once retention time has passed; transferring enhanced copies to new locations and generating copies of enhanced copies if there is a need to provide additional redundancy. Managing the cost of storage allows for cost optimization using copy location, retention and availability.

Figure 3:
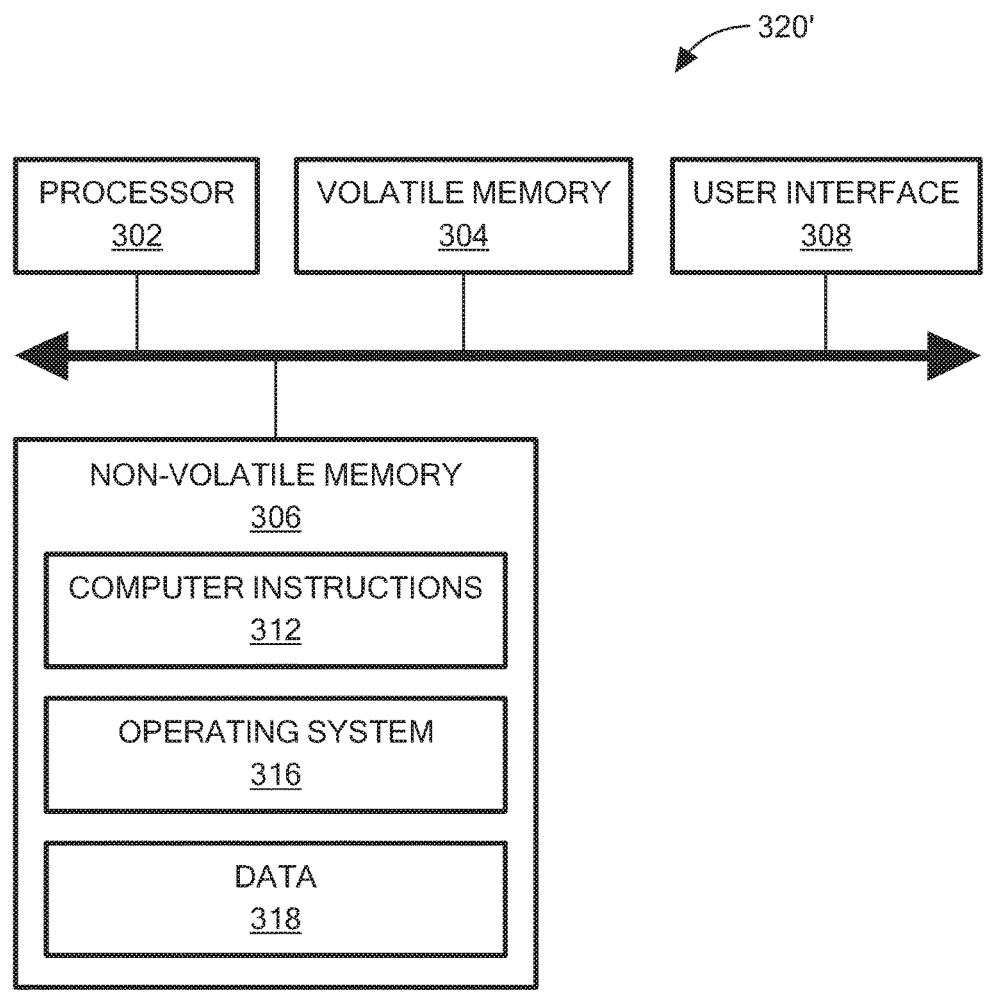
FIG. 3 is a block diagram of an example of a computer on which any portion of the process of FIG. 2 may be implemented, according to one embodiment of the disclosure.

Referring to FIG. 3, in one example, an enhanced copy module 120 is an enhanced copy module 120'. The compression module 120' includes a processor 302, a volatile memory 304, a non-volatile memory 306 (e.g., hard disk) and the user interface (UI) 308 (e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the process 200 is not limited to the specific processing order of FIG. 2. Rather, any of the processing blocks of FIG. 2 may be re-ordered, combined or removed, performed in parallel or in serial, as necessary, to achieve the results set forth above.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method comprising:
   intercepting data from resources used by a computer application;
   generating enhanced copy metadata comprising creating metadata on application operational parameters, parameters to connect to the resources and information about the resources used by the application;
   generating an enhanced copy comprising application data generated from using the application, the application, a configuration of the application, the intercepted data, and runtime settings to run the application;
   attaching the enhanced copy metadata to the enhanced copy; and
   restoring operation of the application, with at least one of the configuration of the application, intercepted data, and the runtime settings using the enhanced copy and enhanced copy metadata.

2. The method of claim 1, wherein the metadata is used to intercept data from the resources used by the application.

3. The method of claim 1, further comprising managing the enhanced copy.

4. The method of claim 1, wherein restoring operation of the application, the configuration of the application and the runtime settings using the enhanced copy comprises restoring at least two of the application, the configuration of the application and the runtime settings using the enhanced copy.

5. The method of claim 1, wherein restoring operation of the application using at least one of the application, the intercepted data, the configuration of the application and the runtime settings using the enhanced copy comprises restoring the application, the configuration of the application and the runtime settings using the enhanced copy, including the intercepted data.

6. The method of claim 1, wherein restoring at least one of the application, the configuration of the application and the runtime settings using the enhanced copy comprises restoring the application, the configuration of the application and the runtime settings using the enhanced copy.

7. The method of claim 1 wherein the resources comprise database or object stores connected by the application during its operation and wherein the parameters to connect to the resources comprise database or object store connection parameters.

8. An apparatus, comprising:
   electronic hardware circuitry configured to:
   generating enhanced copy metadata comprising creating metadata on application operational parameters, parameters to connect to the resources and information about the resources used by the application;
   generate an enhanced copy comprising application data generated from executing an application, the application and data that enables the application to operate, and data intercepted from resources used by the application;
   attaching the enhanced copy metadata to the enhanced copy; and
   access the application data by restoring from the enhanced copy and metadata the application and the data that enables the application to operate.

9. The apparatus of claim 8, wherein the circuitry comprises at least one of a processor, a memory, a programmable logic device or a logic gate.

10. The apparatus of claim 8, further comprising circuitry configured to use the enhanced copy metadata to intercept data from the resources used by the application.

11. The apparatus of claim 8, further comprising circuitry configured to manage the enhanced copy.

12. The apparatus of claim 8, further comprising circuitry configured to restore at least two of the application, the configuration of the application and the runtime settings using the enhanced copy.

13. The apparatus of claim 8, further comprising circuitry configured to restore the application, the configuration of the application and the runtime settings using the enhanced copy.

14. An article comprising:
   a non-transitory computer-readable medium that stores computer-executable instructions, the instructions causing a machine to:
   generating enhanced copy metadata comprising creating metadata on application operational parameters, parameters to connect to the resources and information about the resources used by the application;
   generate an enhanced copy comprising application data generated from executing an application and intercepting data from resources used by the application, the application and data that enables the application to operate;
   attaching the enhanced copy metadata to the enhanced copy; and
   access the application data by restoring from the enhanced copy and metadata the application and the data that enables the application to operate.

15. The article of claim 14, further comprising instructions causing the machine to use the enhanced copy metadata to intercept data from the resources used by the application.

16. The article of claim 14, further comprising instructions causing the machine to manage the enhanced copy.

17. The article of claim 14, further comprising instructions causing the machine to restore at least two of the application, the configuration of the application and the runtime settings using the enhanced copy.

18. The article of claim 14, further comprising instructions causing the machine to restore the application, the configuration of the application and the runtime settings using the enhanced copy.

* * * * *